United States Patent
Srinivasan et al.

(10) Patent No.: US 6,411,992 B1
(45) Date of Patent: Jun. 25, 2002

(54) METHOD AND APPARATUS FOR BROADCASTING INFORMATION OVER A NETWORK

(75) Inventors: Thiru Srinivasan, Highlands Ranch; William White, Boulder, both of CO (US)

(73) Assignee: Qwest Communications Int'l, Inc., Denver, CO (US)

( * ) Notice: Subject to any disclaimer, the term of this patent is extended or adjusted under 35 U.S.C. 154(b) by 0 days.

(21) Appl. No.: 09/322,375

(22) Filed: May 28, 1999

(51) Int. Cl.[7] .............................................. G06F 17/60
(52) U.S. Cl. .................. 709/218; 709/231; 725/35; 705/14
(58) Field of Search ........................ 705/1, 14; 709/217, 709/218, 219, 231; 725/34, 35, 36, 46

(56) References Cited

U.S. PATENT DOCUMENTS

| | | | | |
|---|---|---|---|---|
| 5,515,098 A | * | 5/1996 | Carles | 725/35 |
| 5,600,364 A | * | 2/1997 | Hendricks et al. | 705/1 |
| 5,661,516 A | * | 8/1997 | Carles | 725/35 |
| 5,794,210 A | * | 8/1998 | Goldhaber et al. | 705/14 |
| 6,006,265 A | * | 12/1999 | Rangan et al. | 709/226 |
| 6,020,883 A1 | * | 2/2001 | Herz et al. | 709/46 |
| 6,088,722 A1 | * | 7/2001 | Herz et al. | 709/217 |

* cited by examiner

Primary Examiner—Stephen Gravini
(74) Attorney, Agent, or Firm—Marsh Fischmann & Breyfogle LLP

(57) ABSTRACT

An apparatus and method provides for the scheduling and broadcast of commercials and other information during transmission of multimedia information over a data network. Demographic information is gathered with regards to potential viewers of the broadcast. Through use of this demographic information, during designated commercial breaks during broadcasts of the audio or video information, advertising information can be broadcast to individuals based on the demographic information. The system includes a number of databases which correlate the broadcast schedule with the available commercials for transmission over the data network.

12 Claims, 20 Drawing Sheets

| PROGRAM ID | DATE | DAY | CHANNEL | PROGRAM | PROGRAM START TIME | PROGRAM END TIME | PROGRAM TYPE |
|---|---|---|---|---|---|---|---|
| 1 | 7/30/1998 | THURSDAY | NBC | SUPER BOWL | 19:00:00 | 23:00:00 | LIVE |
| 2 | 7/30/1998 | THURSDAY | FOX | NBA-BULLS VS. NUGGETS | 21:00:00 | 22:30:00 | LIVE |
| 3 | 7/30/1998 | THURSDAY | ABC | DAVID LETTERMAN SHOW | 99:99:99 | 99:99:99 | PRE-RECORDED |
| 4 | 7/30/1998 | THURSDAY | ESPN | SOCCER-WORLD CUP (FRANCE VS. BRAZIL) | 19:30:00 | 21:15:00 | LIVE |
| 5 | 7/31/1998 | FRIDAY | CBS | ER | 17:00:00 | 18:00:00 | LIVE-EVERY FRIDAY |
| 6 | 9/8/1998 | SATURDAY | CBS | ER | 17:00:00 | 18:00:00 | LIVE-EVERY SATURDAY |
| 7 | 9/8/1998 | MONDAY | ABC | MONDAY NIGHT FOOTBALL | 18:00:00 | 21:00:00 | LIVE-EVERY MONDAY |
| 8 | 8/10/1998 | MONDAY | ABC | MONDAY NIGHT FOOTBALL | 18:00:00 | 21:00:00 | LIVE-EVERY MONDAY |

CANCEL

FIG.6

ADD DESIGNATED COMMERCIAL SLOT TO PROGRAM — 68

PROGRAM: SUPER BOWL

DESIGNATED COMMERCIAL BREAK #: ⮕ 63

COMMERCIAL BREAK START TIME: ⮕ 65

COMMERCIAL BREAK END TIME: ⮕ 67

SUBMIT          CANCEL

FIG.7

| PROGRAM ID | DATE | DAY | PROGRAM | PROGRAM TYPE |
|---|---|---|---|---|
| 1 | 7/30/1998 | THURSDAY | SUPER BOWL | LIVE |
| 1 | 7/30/1998 | THURSDAY | SUPER BOWL | LIVE |
| 2 | 7/30/1998 | THURSDAY | NBA-BULLS VS. NUGGETS | LIVE |
| 3 | 7/30/1998 | THURSDAY | DAVID LETTERMAN SHOW | PRE-RECORDED |
| 4 | 7/30/1998 | THURSDAY | SOCCER-WORLD CUP (FRANCE VS. BRAZIL) | LIVE |
| 5 | 7/31/1998 | FRIDAY | ER | LIVE-EVERY FRIDAY |
| 6 | 9/8/1998 | SATURDAY | ER | LIVE-EVERY SATURDAY |

CANCEL

FIG.9

PROGRAM: NBA-BULLS VS. NUGGETS
DATE: 7/30/1988  DAY: THURSDAY  PROGRAM TYPE: LIVE
DESIGNATED COMMERCIAL BREAK #: 1

| COMMERCIAL ID | COUNTRY | STATE | CITY | AGE GROUP | SPONSOR | AD START TIME | RUNNING TIME | AVA START TIME | REMAINING TIME | NEXT COMM ID |
|---|---|---|---|---|---|---|---|---|---|---|
| 7 | USA | CO | DENVER | | BRAND A | 21:10:00 | 60 | 21:10:00 | 119 | NIL |
| 8 | USA | IL | CHICAGO | | BRAND B | 21:10:00 | 30 | ANY | 0 | 10 |
| 10 | USA | IL | CHICAGO | | BRAND C | 21:10:30 | 30 | ANY | 0 | NIL |
| 11 | REST OF WORLD | | | | BRAND D | 21:20:00 | 60 | ANY | 0 | NIL |

ADD A DESIGNATED COMMERCIAL FOLLOWING COMMERCIAL ID:

| |
|---|
| 7 |
| 9 |
| 10 |
| 11 |

75

ADD A DESIGNATED COMMERCIAL — 74    CANCEL

| PROGRAM ID | DATE | DAY | PROGRAM | PROGRAM TYPE |
|---|---|---|---|---|
| 1 | 7/30/1998 | THURSDAY | SUPER BOWL | LIVE |
| 2 | 7/30/1998 | THURSDAY | NBA-BULLS VS. NUGGETS | LIVE |
| 4 | 7/30/1998 | THURSDAY | SOCCER-WORLD CUP (FRANCE VS. BRAZIL) | LIVE |
| 7 | 8/31/1998 | MONDAY | MONDAY NIGHT FOOTBALL | LIVE-EVERY MONDAY |
| 8 | 8/16/1998 | MONDAY | MONDAY NIGHT FOOTBALL | LIVE-EVERY MONDAY |

CANCEL

PROGRAM: SUPER BOWL
DATE: 7/30/1988  DAY: THURSDAY  PROGRAM TYPE: LIVE
AD-HOC BREAK #: 1  TYPE OF COMMERCIAL BREAK #: 1 MIN

| COMMERCIAL ID | COUNTRY | STATE | CITY | AGE GROUP | SPONSOR | RUNNING TIMER | NEXT COMM ID |
|---|---|---|---|---|---|---|---|
| 21 | USA | | | | BRAND F | 30 | 23 |
| 22 | REST OF WORLD | | | | BRAND G | 30 | NIL |
| 23 | USA | | | | BRAND H | 30 | NIL |

ADD AN AD-HOC COMMERCIAL FOLLOWING COMMERCIAL ID:

- 21
- 22
- 23

[ADD AN AD-HOC COMMERCIAL] [CANCEL]

FIG. 14

- SPONSOR: BRAND G / BRAND F
- PROGRAM: SUPER BOWL
- DATE: 7/30/1998  DAY: THURSDAY
- COUNTRY: REST OF WORLD / USA  STATE:
- AGE GROUP: 2-12 / TEEN AGER / 20-45 / RETIREES
- CITY:
- TYPE OF COMMERCIAL BREAK: 1 MIN
- AD-HOC BREAK#: 1
- DATA FILE: BRAND_G.RAM   BROWSE...
- SUBMIT   CANCEL

| PROGRAM | CHANNEL | PROGRAM ID | DATE | PROGRAM TYPE | PROGRAM START TIME | PROGRAM END TIME | |
|---|---|---|---|---|---|---|---|
| SUPER BOWL | NBC | 1 | 7/30/98 | LIVE | 11:00:00 | 13:30:00 | YES |
| NBA-BULLS VS. NUGGETS | LOCAL | 2 | 7/30/98 | LIVE | 12:00:00 | 15:00:00 | YES |
| DAVID LETTERMAN SHOW | CBS | 3 | X/X/XX | PRE-RECORDED | 99:99:99 | 16:00:00 | NO |
| SOCCER-WORLD CUP | ESPN | 4 | 7/30/98 | LIVE | 16:00:00 | 19:00:00 | YES |

FIG.15

| PROGRAM ID | DESIGNATED COMMERCIAL BREAK | COMMERCIAL BREAK START TIME | COMMERCIAL BREAK END TIME |
|---|---|---|---|
| 1 | 1 | 11:30:00 | 11:32:00 |
| 1 | 2 | 12:00:00 | 12:02:00 |
| 2 | 1 | 13:45:00 | 13:46:00 |
| 3 | 1 | 15:00:00 | 15:03:00 |
| 4 | 1 | 16:45:00 | 16:47:00 |

FIG.16

| COMMERCIAL ID | FILE | SPONSOR | RUNNING TIME | COMMERCIAL TYPE | BROADCAST CRITERIA | CHARGES |
|---|---|---|---|---|---|---|
| 1 | DATA.FILE.1 | BRAND A | 00:30 | DESIGNATED | USA | $1000 |
| 2 | DATA.FILE.2 | BRAND B | 01:00 | DESIGNATED | USA | $2000 |
| 3 | DATA.FILE.3 | BRAND C | 01:00 | DESIGNATED | USA | $2000 |
| 4 | DATA.FILE.4 | BRAND D | 01:00 | DESIGNATED | REST OF WORLD | $2000 |
| 5 | DATA.FILE.5 | BRAND E | 01:00 | DESIGNATED | REST OF WORLD | $1000 |
| 6 | DATA.FILE.6 | BRAND F | 00:30 | DESIGNATED | USA | $2000 |
| 7 | DATA.FILE.7 | BRAND A | 01:00 | DESIGNATED | USA.COLORAD.DENVER | $1000 |
| 8 | DATA.FILE.8 | BRAND H | 00:30 | DESIGNATED | USA | $1000 |
| 9 | DATA.FILE.9 | BRAND B | 00:30 | DESIGNATED | USA.ILLINOIS.CHICAGO | $2500 |
| 10 | DATA.FILE.10 | BRAND C | 00:30 | DESIGNATED | USA.ILLINOIS.CHICAGO | $2000 |
| 11 | DATA.FILE.11 | BRAND D | 01:00 | DESIGNATED | REST OF WORLD | $2000 |
| 12 | DATA.FILE.12 | BRAND L | 00:30 | DESIGNATED | USA.2-12 | $1000 |
| 13 | DATA.FILE.13 | BRAND M | 01:00 | DESIGNATED | USA.TEENAGER | $1000 |
| 14 | DATA.FILE.14 | BRAND N | 01:00 | DESIGNATED | USA.TEENAGER | $1000 |
| 15 | DATA.FILE.15 | BRAND O | 00:30 | DESIGNATED | USA.45- | $1000 |
| 16 | DATA.FILE.16 | BRAND P | 00:30 | DESIGNATED | REST OF WORLD | $1000 |
| 17 | DATA.FILE.17 | BRAND Q | 01:00 | DESIGNATED | USA | $1000 |
| 18 | DATA.FILE.18 | BRAND R | 01:00 | AD-HOC | WHOLE WORLD | $2000 |

FIG.17

| PROGRAM ID | COMMERCIAL BREAK | COMMERCIAL ID | COUNTRY | STATE | CITY | AGE GROUP | NON COMMERCIAL ID |
|---|---|---|---|---|---|---|---|
| 1 | 1 | X | USA | | | | 2 |
| 1 | 1 | 1 | USA | COLORADO | | | 2 |
| 1 | 1 | 2 | USA | | | | 6 |
| 1 | 1 | 6 | USA | | | | NIL |
| 1 | 1 | 4 | REST OF WORLD | | | | 5 |
| 1 | 1 | 5 | REST OF WORLD | | | | NIL |
| 1 | 2 | 3 | USA | | | | 17 |
| 1 | 2 | 13 | USA | | | TEENAGER | 14 |
| 1 | 2 | 14 | USA | | | TEENAGER | NIL |
| 1 | 2 | 17 | USA | | | | NIL |

FIG.18

| PROGRAM ID | COMMERCIAL ID | DATE | COUNTER |
|---|---|---|---|
| 1 | 1 | 7/30/98 | 358.913 |
| 1 | 2 | 7/30/98 | 345.554 |
| 1 | 6 | 7/30/98 | 350.144 |
| 1 | 4 | 7/30/98 | 1.853.243 |
| 1 | 5 | 7/30/98 | 1.550.672 |
| 1 | 3 | 7/30/98 | 402.552 |
| 1 | 11 | 7/30/98 | 401.665 |
| 1 | 13 | 7/30/98 | 1.750.587 |

FIG.19

| IP ADDRESS | PROGRAM ID | PLAYER STATUS | LOGIN ID | COUNTRY | STATE | CITY | AGE GROUP |
|---|---|---|---|---|---|---|---|
| 236.82.18.4 | 3 | PLAYING | JDOE1 | USA | CO | DENVER | 2-12 |
| 100.92.98.14 | 3 | PLAYING | JDOE2 | USA | WA | SEATTLE | TEENAGER |
| 976.10.98.1 | 3 | PLAYING | JDOE3 | USA | NY | NEW YORK | 20-45 |
| 455.72.128.3 | 3 | PLAYING | JDOE4 | USA | AZ | PHOENIX | RETIREE |
| 236.192.8.2 | 3 | PLAYING | JDOE5 | UK | BM | LONDON | 45- |
| 100.92.98.14 | 6 | PLAYING | JDOE6 | BRAZIL | RO | RIODEJANERIO | 20-45 |
| 976.10.98.1 | 2 | PLAYING | JDOE7 | USA | ID | BOISE | 45- |

FIG.20

METHOD AND APPARATUS FOR BROADCASTING INFORMATION OVER A NETWORK

FIELD OF THE INVENTION

The invention described herein relates to a method and apparatus for scheduling and broadcasting multimedia information over a data network, and especially to a method and apparatus which provides for the selective transmission of multimedia information to particular members of an audience according to demographic information.

BACKGROUND OF THE INVENTION

Radio and television are two popular forms of media for providing information or programming to the public. Broadcasts of multimedia information may be made over the airwaves or over a data network, such as cable, with the goal of the broadcasters to reach as many people as possible. There are currently a number of systems employed to monitor or count the numbers of people receiving the broadcast. The most notable of the systems is the Nielsen ratings for television, and the Arbitron System for radio. In each system, the monitoring is performed by taking samples of target audiences and using this information to extrapolate a constitution for the audience.

This demographic information is very important to the TV and radio industry. The demographic numbers show how much of a certain segment of the population watch or listen to a particular show. Based on the viewership or istenership of a particular program, rates for advertising products or services during a particular show may be determined. The higher the viewership, especially in particular demographics, the higher the rate the advertisers are willing to pay in order to advertise their products or services.

One of the technologies which may soon be implemented on a large scale is the large scale broadcast of multimedia signals over a data network such as the World Wide Web. Currently, multimedia information such as television and radio shows are broadcast, over the Internet to users who have logged on to a particular website, but because of bandwidth constraints, the quality of the information that is broadcast is not currently good enough to replace the traditional methods of broadcasting. As Internet technology improves, and its quality and ease of use exceed the traditional modes of communications, advertisers may look to this new medium as a way to advertise their goods and services.

SUMMARY OF THE INVENTION

The inventors have recognized that with the use of data networks such as the World Wide Web for broadcasting audio and video information, certain systems or methods may be employed to take advantage of this medium for multimedia communications. With the ability to instantly collect information about those system users who have established connection to the network, specialized advertising may be transmitted to particular users during the course of a broadcast.

Described herein is an apparatus and method for scheduling and broadcasting segments of information, such as advertising, as part of a multimedia presentation over a data network. Included in the system is a broadcast device such as a network server which includes the necessary hardware and software in order to access video and audio information and then provide this information to system users with the capabilities to receive such information. The broadcast server may include functionality to broadcast video or audio information received from a remote source to the users who have logged-in, or provide functionality for the users to access and download multimedia information from a designated database.

The broadcast server may include a interface with the data network through which information is transmitted and received. The operations of the server are directed by a processing device which in turn is connected to a data storage device. The data storage device may include a variety of different data sources. One data source may include a schedule of programming to be broadcast. The schedule may include a description of programs to be broadcast, day of broadcast, start and end times, as well as any other relevant information. Another data source may include tables which contain information relating to the commercials which will be broadcast during a particular program, the breaks in which these commercials will be broadcast, the length of the commercials as well as the demographic group to which the commercial is to be broadcast.

Another data source may contain the multimedia files for commercials to be broadcast. Specifically, information may include the location of the data file which contains either the visual or audio information, the related sponsor, as well as the demographic information relating to the target audience. Further tables may contain information relating to the individual sponsors as well as tables which are employed to track the number of viewers for a particular commercial.

In one aspect of the invention a data source may also be provided which includes multimedia files which a system user may download and play. This may be provided as an alternative to broadcasting. These stored files may also be broadcast by the server in a normal broadcast instead of receiving programming from a resource server.

In order to schedule commercials, access may be provided to the server for a remotely located programmer. Upon providing access, a series of display graphics may be provided by the server which a programmer may interact with to view the current programming schedule and then schedule programming and commercials. A first display graphic may be provided which provides a programmer the option to perform a number of functions. Functions which may be provided included viewing the list of programs, adding a program to the schedule, adding a sponsor to the sponsor list, and adding, deleting, or amending commercial which are scheduled for broadcast.

In another aspect of the invention, the scheduling procedures may be performed from a remote location over a data network such as the Internet. A programmer through a personal computer may dial an Internet Service Provider (ISP) and upon establishing a connection, perform the above described functions.

Prior to operation of the broadcast system, the schedule for broadcasting programs may be retrieved from the appropriate data source. Those parties which are to receive the broadcast over a data network may log-in to the broadcast server, thus providing their IP address. Stored in a database may be demographic information relating to the particular viewers who are logged-in. The demographic information may include such things as country of residence, city, state, as well as sex, age, and/or income group. This information may also be requested from the user when access is first granted to the system.

According to the schedule stored in a data source, at the allotted time, the broadcast of a program is begun. Within each program there may be a number of designated commercial breaks, and if the program is live or otherwise allows for it, ad-hoc commercials can be inserted as necessary. Once a commercial break is reached, a table containing the commercials to be broadcast may be accessed and the appropriate data files retrieved from the database. At this point, an analysis may be made of the parties who are currently receiving the broadcast in order to determine to which parties certain commercials may be broadcast. Also included in the designated table may be commercials which will follow the one currently being broadcast in order to fill up the allotted commercial break. Different commercials may be shown simultaneously to viewers of different demographics.

During the broadcast of a particular commercial, the number of viewers viewing a particular commercial may be counted and stored in the database. This information may later be employed to establish the billing rate for particular commercials.

In another aspect of the invention, system users may access the server to upload and view multimedia files. An alternative to the broadcasting of programming, is providing user access to the multimedia files so that they may be downloaded from the server. The viewer information may be reviewed in the same manner as described above. Commercial breaks will be programmed into the multimedia files and when the server detects that a break has occurred, will access the commercials to be broadcast to the user based on the demographic makeup. The commercials are inserted in the download and their viewing may be documented.

BRIEF DESCRIPTION OF THE DRAWINGS

FIG. 6 discloses a schedule listing for designated commercials, including channel identification as well as program start and end times.

FIG. 7 discloses a screen display employed for entering commercial breaks for designated advertisements.

FIG. 9 discloses a graphical input screen for viewing commercials in a television schedule.

FIG. 10 discloses a graphical input screen for adding designated commercials at a particular point in a television schedule.

FIG. 11 discloses a graphical input screen for entering designated commercials.

FIG. 12 discloses a schedule of programming to which ad-hoc commercials may be added.

FIG. 13 discloses a graphical input screen for inputting ad hoc commercials to the television schedule.

FIG. 14 discloses a graphical input screen for adding ad hoc commercials to the system.

FIG. 15 discloses a data table which contains the schedule for the programs.

FIG. 16 discloses a schedule for broadcasting commercials.

FIG. 17 discloses a data table which correlates data file location with sponsor and also includes various demographic information.

FIG. 18 discloses a data table which includes the order in which commercials are to broadcast.

FIG. 19 discloses a table employed to count the numbers of parties which receive a particular commercial.

FIG. 20 discloses a data table which includes demographic information regarding potential parties to receive the broadcasts.

DETAILED DESCRIPTION

Figure 1:
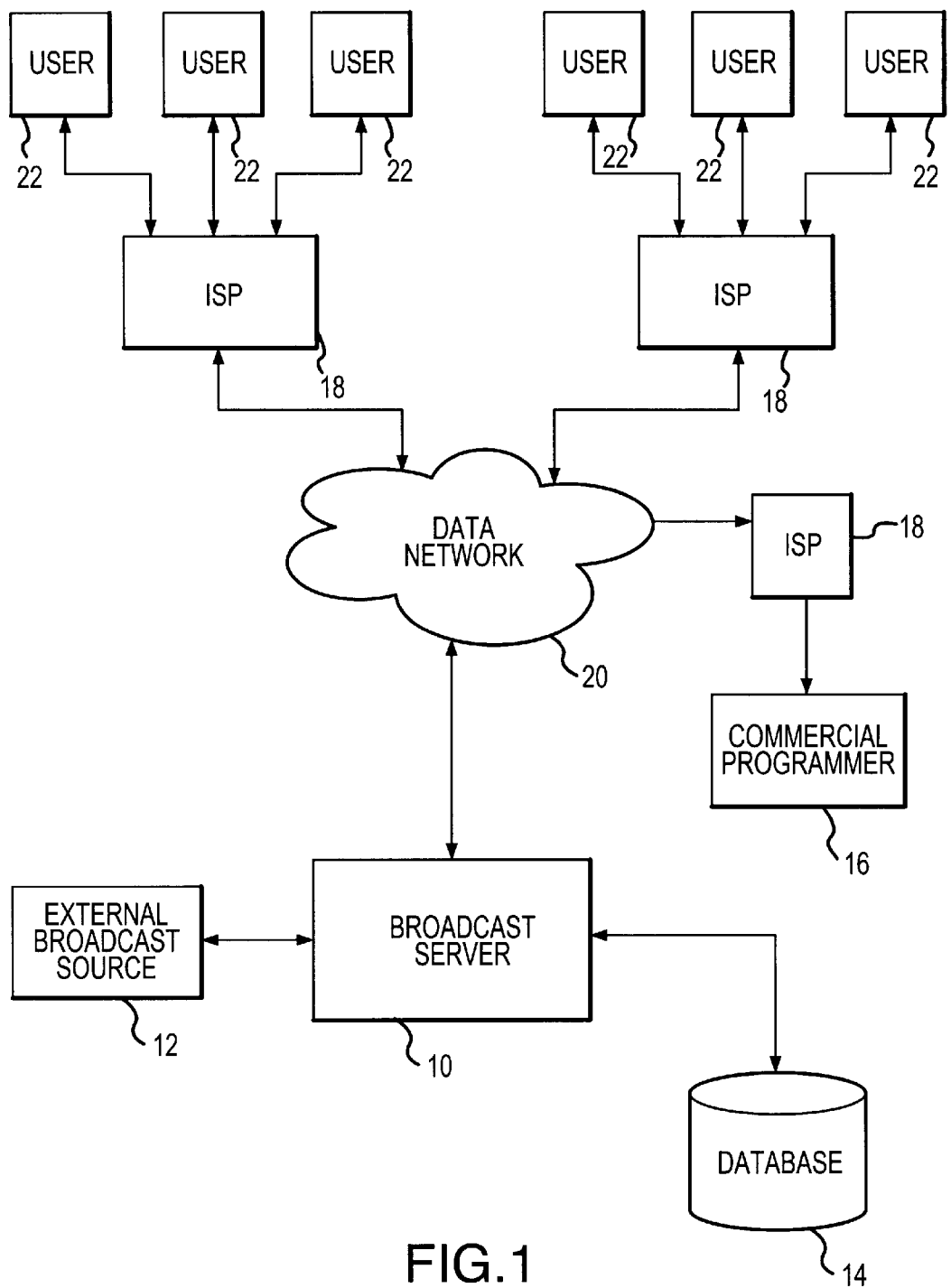
FIG. 1 discloses a diagram for the data network broadcasting system.

Disclosed in FIG. 1 is a data network broadcast system which provides for the broadcast of video and audio programs to system users who have the capability to receive and process these types of multi-media information using a player such as "RealPlayer™," Oracle Video Client, or Microsoft's "NetShow". The users may establish a connection with the data network 20 through use of a remotely located personal computer. This connection may be made over a telephone line to an Internet Service Provider (ISP) 18, or may be made through a backbone connection to a local area network (LAN) which may be connected to the data network 20. In the case where an ISP is used to establish the connection, the ISP will connect the system user 22 to a data network 20 such as the Internet. The Point of Broadcast for the multi-media transmissions may be a network server 10 which has the functionality to process multimedia information. In connection with the server 10 may be a database 14 which includes various stores of information to facilitate the transmission and monitoring of broadcasts. Also connected to the broadcast server 10 may be an external broadcast source 12 from which a portion of the programming to be broadcast is received. Such broadcast sources may include television or radio stations, or any other source of programing from which a broadcast server 10 may retrieve information. The broadcast server 10 translates the transmission received into a streaming video format, that a player can interpret.

Another connection to the broadcast server 10 may be from a commercial programmer 16. Through the commercial programmer 16, various interaction may be provided for a remotely located system user as to the scheduling of programming for broadcast by the server 10.

The system described herein may be employed to schedule and then broadcast segments of information, such as commercials, during programs being broadcast from the server 10. The system may also be employed to create television schedules which include the commercials. The system described herein provides a substantially automated process for creating a programming schedule and selecting and scheduling commercials at designated breaks within the programs.

Figure 2:
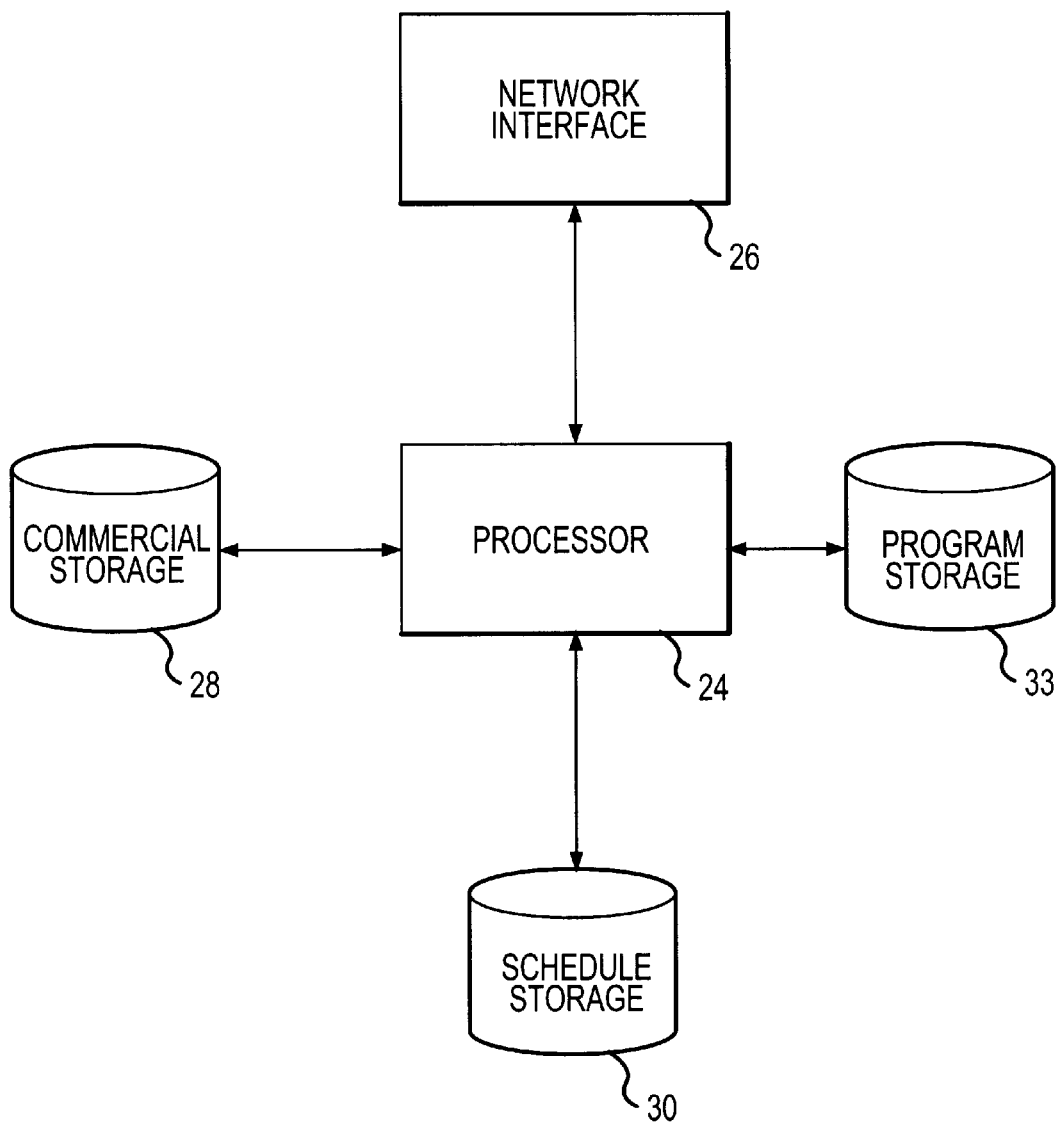
FIG. 2 discloses an internal system diagram for the broadcast server.

Disclosed in FIG. 2 is the internal system diagram for the broadcast server 10. The connection to the data network 20 is provided through the network interface 26. This network interface also provides for the receipt of programs or other information to be broadcast. The processor directs the operations of the broadcast server 10 and through use of a number of different data stores, provides programing to be broadcast, performs the necessary conversions to the data format for broadcast over the data network 20, and then finally the actual broadcasting. The functions performed by the processor will be described in greater detail below.

A number of different data sources are accessed by the processor 24 in order to broadcast both programs and commercials to users which are logged-on to the broadcast server 10. Each data store includes a number of different tables which are accessed by the processor 24 when making broadcasts. The program storage 33 includes the data files of pre-recorded programs to be broadcast from the broadcast server 10. The commercial storage 28 contains data files for the commercials to be broadcast. Each commercial includes a descriptive file name so that it may easily be identified. Schedule storage 30 includes all of the information and data tables employed by the processor when making broadcasts over the network.

The broadcast server 10 described herein provides the unique capability to easily schedule and closely control the commercials which are transmitted to the system users logged-on to the broadcast server 10. If prior to making the broadcasts, system users who have logged-on provide certain demographic information about themselves, the broadcast server 10, through use of the IP address of the system users, may broadcast commercials directed at the particular system user. Described below are a series of tables which includes information employed when broadcasting a schedule of programming and commercials.

One function provided by the system is the ability to create a schedule of programming and further schedule commercials to be broadcast during that programming schedule. Through use of a personal computer, the programmer may establish a connection with the broadcast server over the data network. Access to the broadcast server may be restricted only to authorized users, as such the programmer may be required to enter a user ID and password to gain access. Once access is granted, a number of display graphics are presented which the programmer may interact with in order to perform functions relating to the scheduling and broadcast of programming and commercials.

Figures 3, 4:
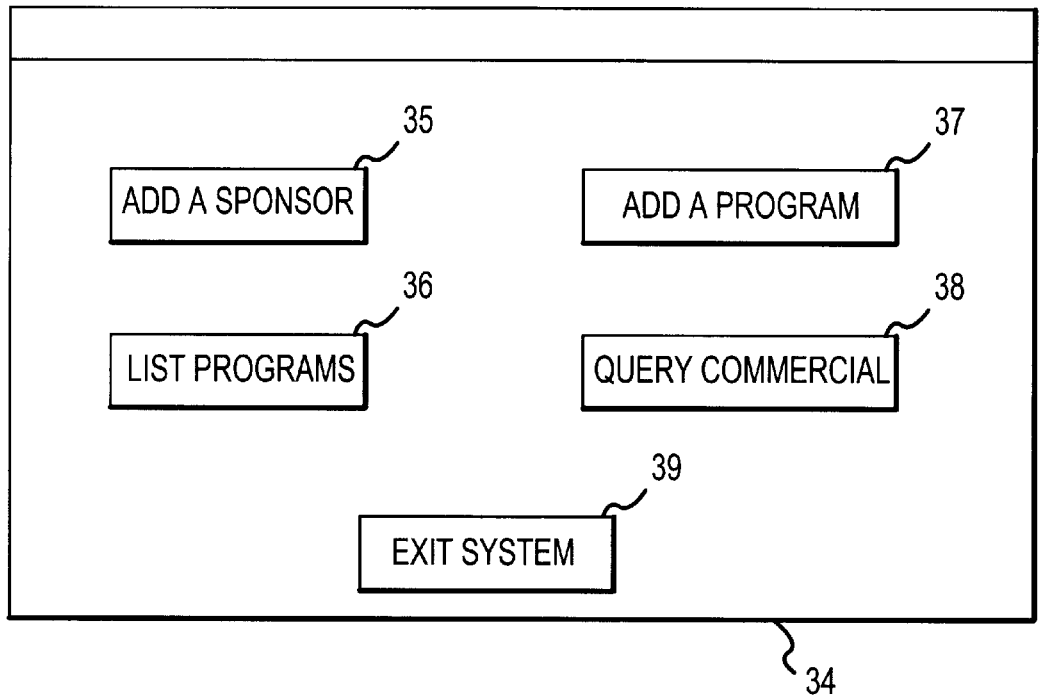
FIG. 3 discloses a graphical input screen presented by the broadcast server through which various functions of the commercial creator system may be performed.
FIG. 4 discloses a graphical input screen for adding a new sponsor.

Disclosed in FIG. 3 is a display graphic 34 which may be employed to initiate a number of the functions relating to the scheduling of commercials. In the display graphic 34 a number of options are provided to the programmer in order to perform various functions relating to scheduling. Upon selection, of any of the options, additional graphical displays will appear which provide for the entry or manipulation of data.

If the programmer wishes to add a sponsor to the existing list, the "Add a Sponsor" button 35 is depressed and the display graphic 42 disclosed in FIG. 4 is presented. A number of places are provided in the display graphic to enter relevant information with regards to a newly added sponsor. This information may include name 44, address 46, account mail 48 and account number 50. Upon completion, the "OK" button 52 may be depressed and the information entered is stored in the database.

Figure 5:
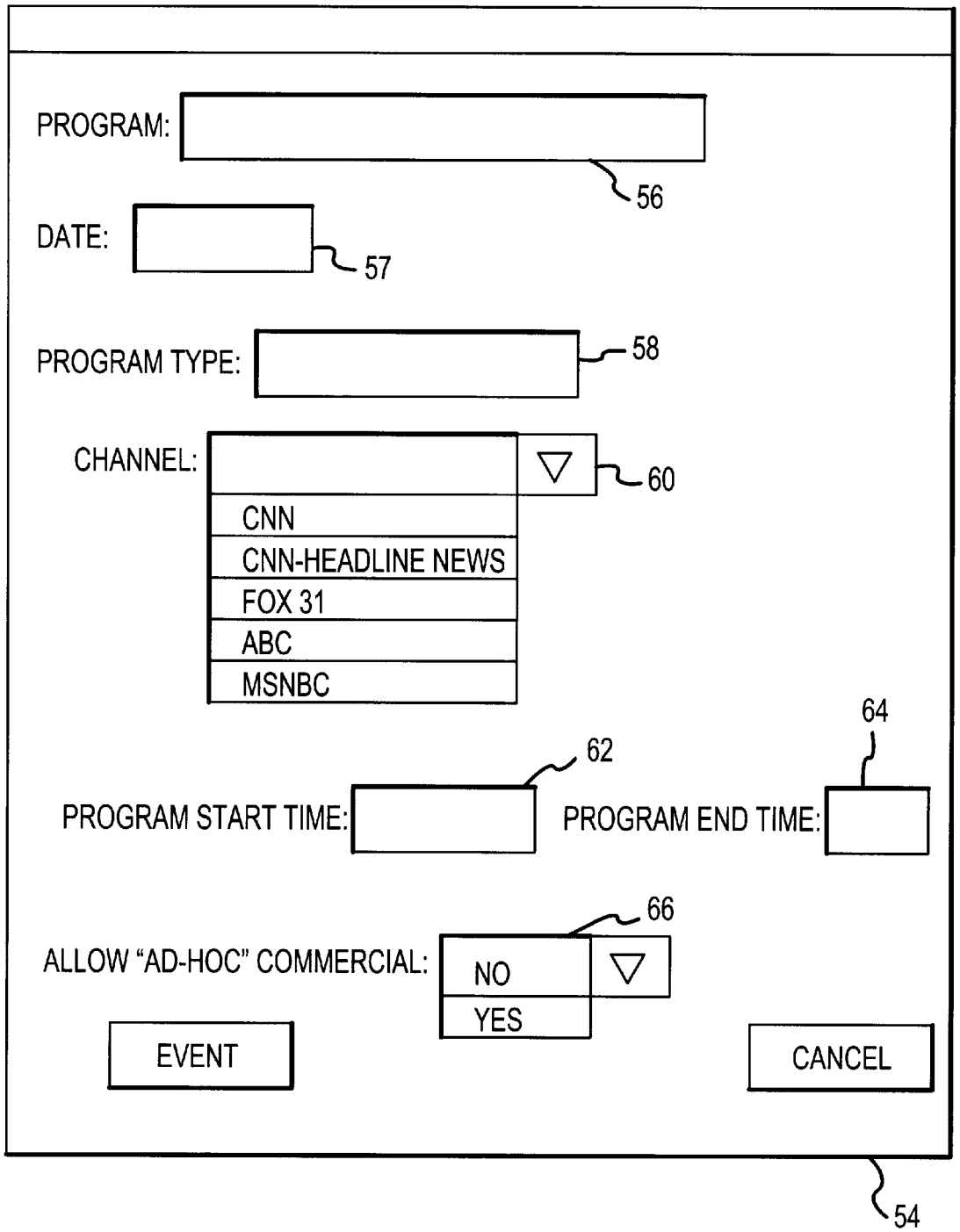
FIG. 5 discloses a graphical input screen for adding programs for the purpose of creating a television schedule.

If the "Add a program" button 37 is selected in the display of FIG. 3, the display graphic 54 disclosed in FIG. 5 is presented. This screen provides the functionality to insert a program in a broadcast schedule. Dialog boxes are provided in this graphic to enter the name of the program 56, the date the program is being broadcast 57, as well as the type of program 58. Because the broadcaster may broadcast a number of different channels, a selection 60 of these different channels may be provided. Additional information such as program start time 62 and program end time 64 may be included. An additional query 66 may be made as to whether "ad hoc" commercials are allowed during broadcast of the program. An ad hoc commercial is a type of commercial which may be shown during a program which has a number of non-designated commercial breaks. An example of such a program may be a sporting event in which commercials may be shown during time-outs or other breaks in the action which are not predictable. Ad-hoc commercials are usually one to two minutes long.

Returning again to the display graphic disclosed in FIG. 3, if a programmer selects the "List Programs" button 36, the display graphic 59 disclosed in FIG. 6 is presented. Included in this graphic is a listing of programs to be broadcast from broadcast server 10. Information displayed may include the program ID 61 (which may be a hypertext link), the date of broadcast, the channel, the particular program, the program start and end time, as well as the type of program, i.e., whether it is live or pre-recorded. Other information which may be included may relate to whether the program is a one-time showing, a new program, or a program which is shown on a regular basis. Through use of this information, a programmer may select a particular program during which a commercial may be broadcast.

Upon selection of a hypertext link 61 associated with a program, the display graphic 68 shown in FIG. 7 is presented. Through this particular display graphic a programmer may program into a particular program commercial slots for designated advertisements. Through block 63 a number for a designated commercial break may be entered, and through blocks 65 and 67 the start and end times may be entered from the newly created break. This information may be submitted and then stored in memory.

Figure 8:
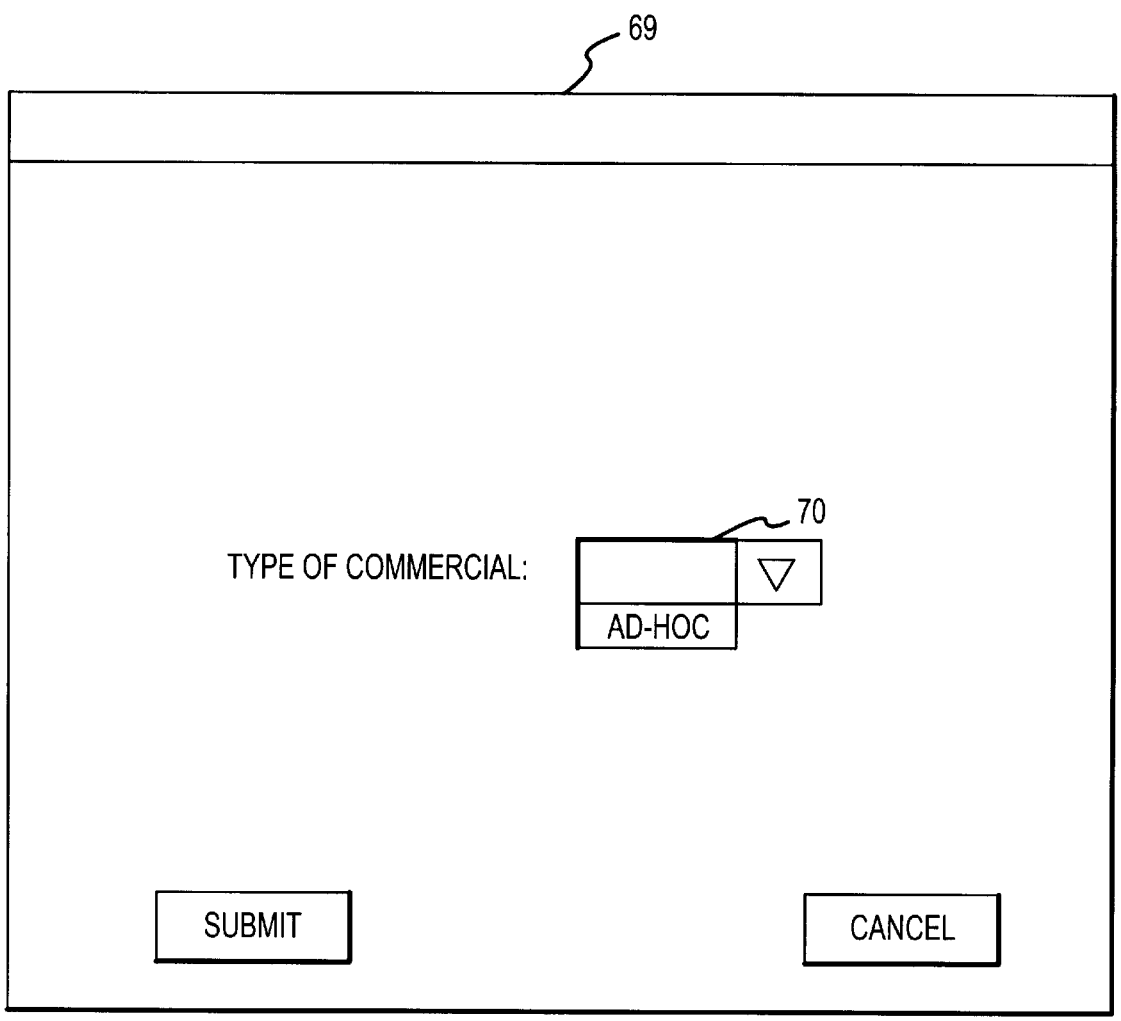
FIG. 8 discloses a graphical input screen which provides a choice between a designated or an ad hoc commercial.

If the "Query commercials" button in the display graphic of FIG. 3 is selected, the display graphic 69 disclosed in FIG. 8 is presented which includes a query 70 as to whether the commercial is designated or ad hoc. If the dialog box "Designated" is selected, the display graphic 71 shown in FIG. 9 is presented. Disclosed is a program listing which is similar to the one shown in FIG. 6. Each program listed includes a program ID 72 which, as a hypertext link, may be selected to reveal further information about the particular show. The display graphic presented upon selection of a particular program ID is disclosed in FIG. 10.

Disclosed in the display graphic 75 is the commercial schedule for a particular program during a designated commercial break. In the example shown, the program is a basketball game and the designated commercial break is #1. Shown is a listing of all the commercials which are going to appear during that particular commercial break. Information included is the ID for the commercial, the demographics for the audience to which the commercial will be broadcast, the sponsor as well as the start time, running time, and the next commercial to follow. This screen can be viewed by the programmer in order to identify open slots for the insertion of commercials. Through selection of the "Add a Designated Commercial" button 74, the display graphic 78 disclosed in FIG. 11 will be presented allowing the programmer to enter the necessary information for adding designated commercials to a particular program.

Figure 11:
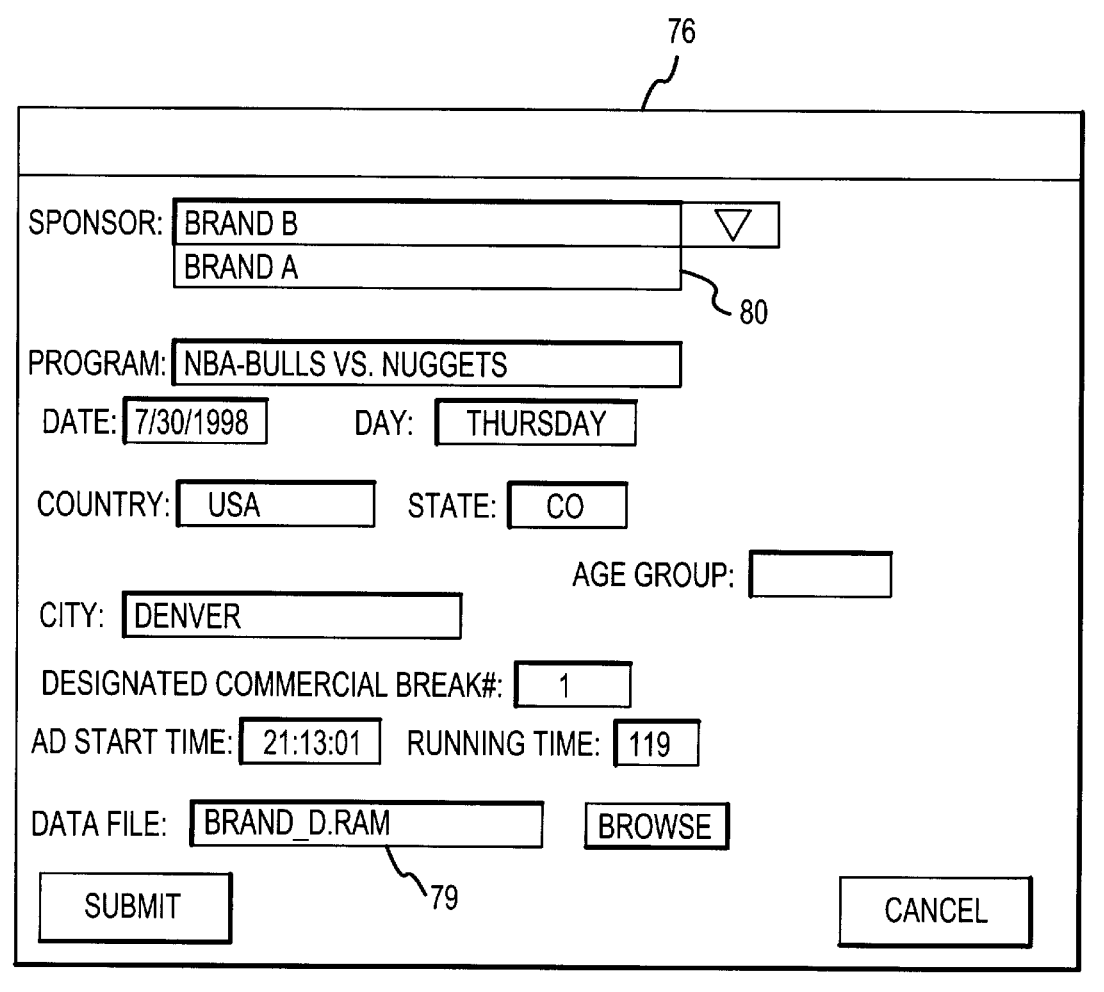

As seen in FIG. 11, the programmer may first retrieve the sponsor name for which the commercial belongs. Next the necessary information may be entered as to demographics of the audience to which the commercial will reach. As described above, the programmer may select which commercial break during a particular program the commercial will appear. With regards to the actual commercial that will be shown, these data files are all stored in a remote database which is accessible by the broadcast server 10. Whenever a particular commercial is to be broadcast, the digital information is retrieved and it may be broadcast at the designated time. A dialog box 79 is provided for the programmer to either browse the commercials that are currently stored in the database, or to type in a path to the desired commercial. After the necessary information has been entered, a submit button may be selected which transmits to the information to the broadcast server 10, which in turn enters the commercial into the broadcast schedule.

An option which exists while scheduling commercials to be broadcast is to include icons which will be displayed on the screen when the commercial is being played. The system user may then select the icon and establish a connection with the advertiser. This may be done by either accessing the advertiser's website or establishing a telephonic connection using IP telephony. The information for establishing this connection is stored as part of the commercial.

If for example, the programmer wishes to enter an ad hoc commercial into a program, the ad hoc choice is selected from the display graphic disclosed in FIG. 8. Upon selection, the program listing 80 shown in FIG. 12 is displayed. When the Hypertext Link 76 for a particular program is selected, in this case the Super Bowl, the display graphic 82 shown in FIG. 13 is presented. In the example shown, the ad hoc commercials which may be shown during a Super Bowl broadcast are presented. Included are the commercial IDs, the demographics to which it will be shown as well as the running time and the commercial which will follow.

A button 84 is provided in the display graphic to add an ad hoc commercial. Once the selection has been made to add an ad hoc commercial, the display graphic 86 disclosed in FIG. 14 is presented. Through this display graphic, the programmer may find the desired sponsor, and enter the requisite demographics. As with the designated commercials, the data file 88 containing the commercial to be shown is stored in a remotely located the database. Once this is done, the submit button may be selected and the commercial is entered into the programming schedule.

Once all the programs and commercials have been scheduled, the broadcasting of this multimedia information may begin. In order to broadcast the programs and commercials, the system described herein employs information which is retrieved from a number of data sources. As was discussed above, the source of the program may come from an external broadcasting source, or may be retrieved from the database of the broadcast server. In order to broadcast the multimedia information in the desired order, a number of tables are employed which when accessed provide the necessary scheduling information. A number of these tables are compiled as part of the scheduling process described above. Provided below is a description of the tables which are employed herein.

Disclosed in FIG. 15 is a table stored in the database for the broadcast server 10. This table includes information employed by the broadcast server 10 when broadcasting programming to the system users. The table includes descriptive information as to the shows to be broadcast. Included in one column of the table may be the title of the show, such as a basketball game or a movie. Another column may be the ID number assigned to the particular program so that it may be referenced in other tables stored in the database. Other information may include the channel on which the program is broadcast, the date which the program will be broadcast, whether the program is live or prerecorded, the start and end times for the program, and whether ad-hoc commercials may be inserted during the broadcast.

Disclosed in FIG. 16 is a table which includes information relating to when commercial breaks are to occur during the broadcast of a program. One column may contain the program ID, which is the number assigned to a particular program to be broadcast. Within each program there may be a designated number of commercial breaks, each break is assigned a number within the show. Also included in the table are the start and end times for the designated commercial breaks.

Disclosed in FIG. 17 is yet another data table which in one column includes the identification number assigned to each commercial. Because there are many ads that may be shown during a broadcast schedule, they are organized by a particular identification number. Also included in the table is the location of the file containing the multimedia information for the associated commercial. As disclosed above, a separate database stores the actual content for each commercial. Also associated with each commercial ID and data file may be the particular sponsor. Other information included may relate to the running time of the particular commercial as well as the desired demographic to which the commercial will be broadcast.

Disclosed in FIG. 18 is a table which associates program IDs with associated commercial breaks within a particular program. Other items which may be included in this table include demographic information such as the country to which the commercial will be broadcast, as well as state and city. Other information may include the age group to which the commercial is directed. Finally, if the commercial is to be shown consecutively with another commercial within a particular commercial break, an association may be created.

Disclosed in FIG. 19 is a table which is used to store information relating to the number of users which receive the broadcast of a particular commercial. Through use of the information in this table, a broadcaster may determine its broadcasting rates based on the number of viewers or listeners to a particular commercial. Information included may be the commercial ID, the show during which the commercial was broadcast, the date, and the number of users to which this was broadcast. After the program is broadcast the statistics(i.e., the "counter" column may be e-mailed or otherwise delivered to the sponsor.

Disclosed in FIG. 20 is yet another table which contains current information relating to system users who may have established a connection with the broadcast server 10. This table is created at the beginning of a broadcast and is continually updated by the broadcast server 10 as system users come and go. Information listed for a particular system user may include IP address, the particular program which the user is currently viewing, whether the user is currently receiving or has paused the player at the interface, and/or what their log-in ID is. The file may further contain demographic information relating to the user receiving the broadcast. The location information may be specific enough to identify the city, state and country from which the system user is receiving the broadcast.

Figure 21:
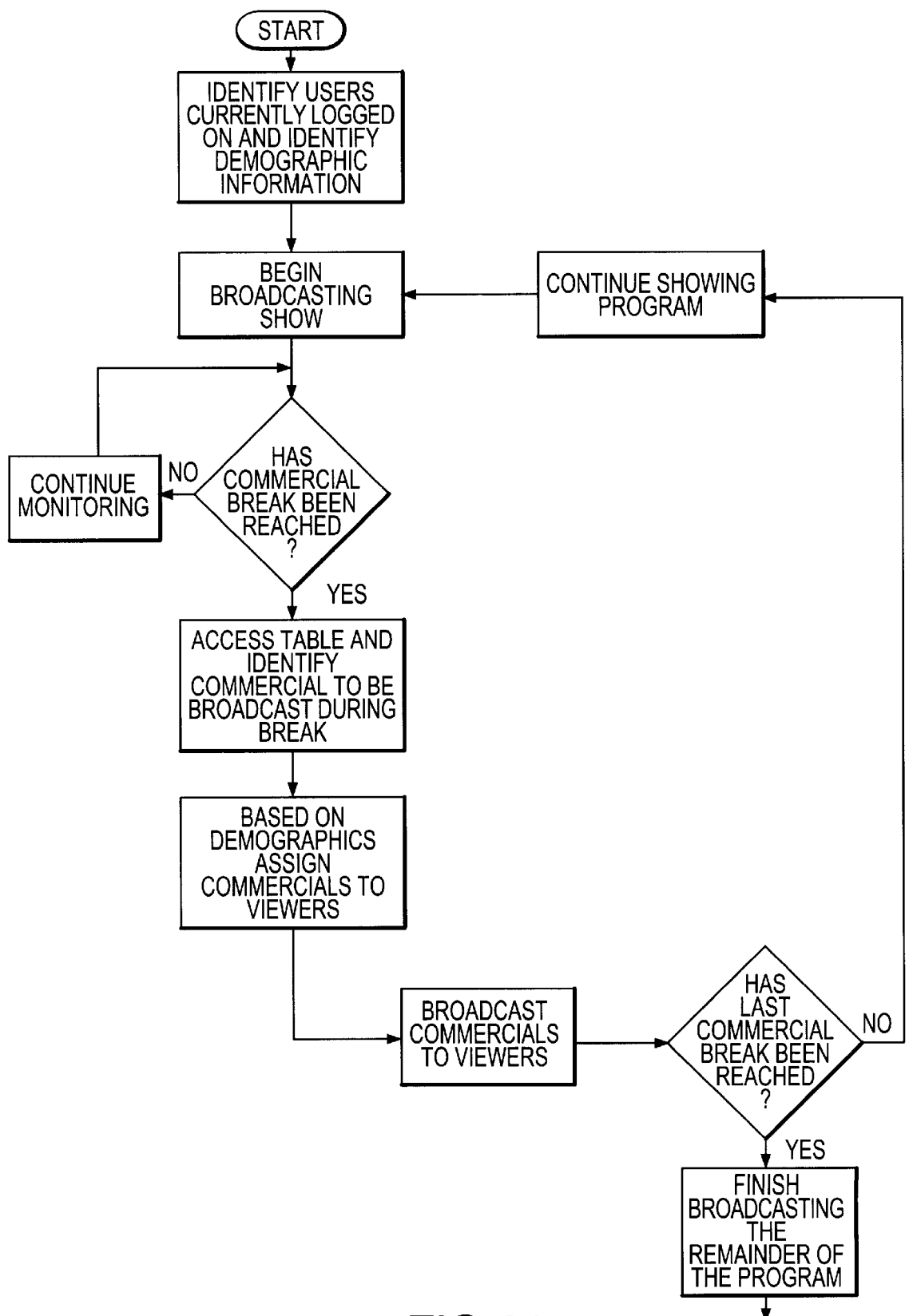
FIG. 21 discloses a flow-chart which describes the operations of the data network broadcasting system.

The operation of the broadcast system can be better understood through review of the flow-chart disclosed in FIG. 21. Prior to the broadcasting of a show, the system users that wish to receive the show log-in to the broadcast server 10. At this point, the server 10 detects which parties are logged-in and accesses the data files (profiles) to locate information relevant to each user. If there is no profile on the user, the party may be required to enter the necessary demographic information before access will be granted. Another option is to set up a membership for logging-in to the broadcast server 10. demographic information is gathered at the time of joining, and a login ID is established.

Once all of the system users have logged-in, a check is performed to extract all necessary demographic information in order to transmit the appropriate commercials to the parties. The schedule of programs is accessed by the system user and after selection of the hypertext link associated with the program, the program is either broadcast live or is retrieved from the database and transmitted. If the program is a live broadcast, a remote site, such as a T.V. or radio station is accessed, and the broadcast is begun. Other information relating to the program is also retrieved from the database including such things as the number and timing of the commercial breaks. When the first commercial break is reached during the broadcast, the commercial listing table in FIG. 18 is accessed, and the table in FIG. 17 is accessed to identify the file(s) associated with the commercial(s). The commercial ID(s) is identified and the commercial(s) scheduled to be broadcast on the system is then accessed and retrieved from the database. Because there are a number of system users with different demographics viewing a particular program, all commercials for the different demographics are also copied from the database. For example, some commercials may be directed towards viewers in the United States while others are directed to viewers from the rest of the world. Some more general commercials may be included in the lists so that all possible demographics are covered.

After the commercial break is complete, the broadcast server 10 resumes broadcasting the program. All during the time of the broadcast of the program, commercial breaks occur at predetermined times and at each break, the same procedure is performed with regards to broadcasting commercials as that was described above. These processes are performed for all of the commercial breaks, including ad-hoc breaks. Because ad hoc breaks are unpredictable, a system administrator may manually trigger the broadcast of an ad hoc commericial. At the end of one program, the viewer may wish to watch another program. If so, the database is accessed for the next program of the schedule and the broadcast of the program is then begun.

Figure 22:
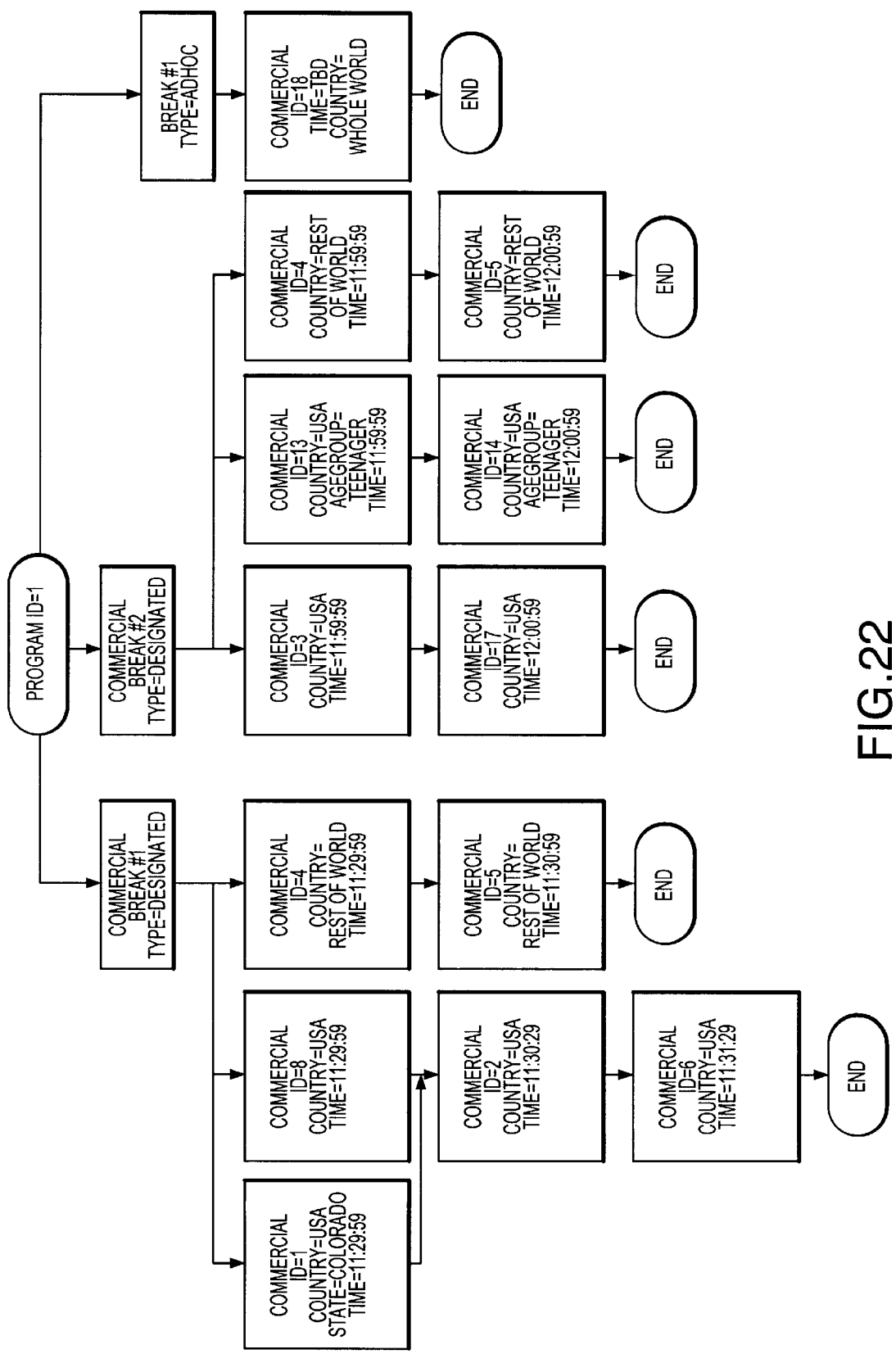
FIG. 22 discloses a flow-chart which describes the broadcasting of commercials during a particular program from an external broadcast source.

FIG. 22 discloses a decision tree employed when broadcasting commercials during program ID=1. A broadcast schedule and identifying information for program ID=1 is disclosed in FIG. 15. For example purposes, there are two scheduled commercial breaks as well as an ad-hoc break scheduled during program ID=1. The times for these breaks may be found in the table of FIG. 16. Further, the table in FIG. 18 contains the commercials assigned for a particular break as well as the demographic information associated with the commercial. As can be seen, at the first commercial break, three commercials are scheduled to be broadcast simultaneously, one for everyone in Colorado, one for everyone in the USA, and one broadcast to the remainder of the world. Specifically these are commercial ID's 1,8, and 4. According to the tables in FIG. 17 and 17, the commercial ID 1 refers to the commercial for Brand A which has a running time of thirty seconds, commercial ID 8 refers to Brand H which has a running time of 30 seconds, and commercial ID 4 refers to Brand D and has a running time of 60 seconds.

As is seen, commercial ID's 1, 8, and 4 run simultaneously to different audiences. Commercial ID 1 is broadcast just to Colorado, commercial ID 12 is broadcast to the rest of the USA, and commerical ID 4 is broadcast to the rest of the world. After commercial ID's 1 and 8 have completed, according to the table in FIG. 18, the next commercial to be broadcast is commerical ID 2 which is shown to the entire USA. As can be seen in FIG. 17, commercial ID 2 refers to Brand B and this commercial runs for one minute. In order to complete the two-minute allotted time-slot for this commercial break, a final commercial, commercial ID 6, is shown to the United States audience. This commercial advertises Brand F and runs for 30 seconds.

With regards to the viewers in the rest of the world, after commercial ID No. 4 is complete, according to FIG. 18, commercial ID No. 5 is broadcast. As can be seen in FIG. 17, commercial ID 5 advertises Brand E, and has a running time of one minute. As can be seen in all decision trees, the length of time the commercials are broadcast is a total of two minutes. Once this commercial break is finished, the regular program resumes.

When commercial break number 2 is reached during the broadcast, according to the schedule shown in FIG. 16, it is seen that this break begins at 12:00 and ends at 12:02. According to the decision tree in FIG. 22, the first commercials shown during the second commercial break are commercial ID 3, 13 and 4, depending on the demographics of the audience. The designated audience for commercial ID 3 is the USA and, according to FIG. 17, has a running time of one minute. Commercial ID 13 is broadcast to teenagers viewing the program in the United States. The rest of the world views commercial ID 4 during the first minute.

After commercial ID 3 runs its course, commercial ID=17 is run. According to FIG. 17, commercial ID=17 runs for a period of one minute and is directed towards viewers in the USA. After this commercial is run, the commercial break is complete. Broadcast simultaneously with commercial ID=17, are commercial ID=14 and commercial ID=5. Commercial ID=17 is directed towards teenagers in the USA, and commercial ID=5 is directed to the rest of the world. The broadcast of all the commercials is complete at 12:02.

During the broadcast of program ID=1, a number of ad-hoc advertisements may also appear throughout. Because the show described is a football game, time-outs or other interruptions may occur throughout the broadcast which are not predictable. When this occurs, there is a listing of ad-hoc commercials which can be inserted and can be broadcast to different demographic groups in the same manner as the designated type of groups described above. In the decision tree shown in FIG. 22, commercial ID 18 will be broadcast to all audiences when an Ad Hoc commercial is shown. Commercials targeted at specific demographics may also be broadcast as ad hoc commercials.

The decision tree disclosed in FIG. 22 is mainly directed to a broadcast of a live program. The broadcast server also provides the capability for system users to access multimedia files stored in memory at chosen times. During the upload of the multimedia files, commercials may inserted for viewing by the system users. The broadcast server includes the functionality to provide simultaneous access to multimedia files contained in the database.

Figure 23:
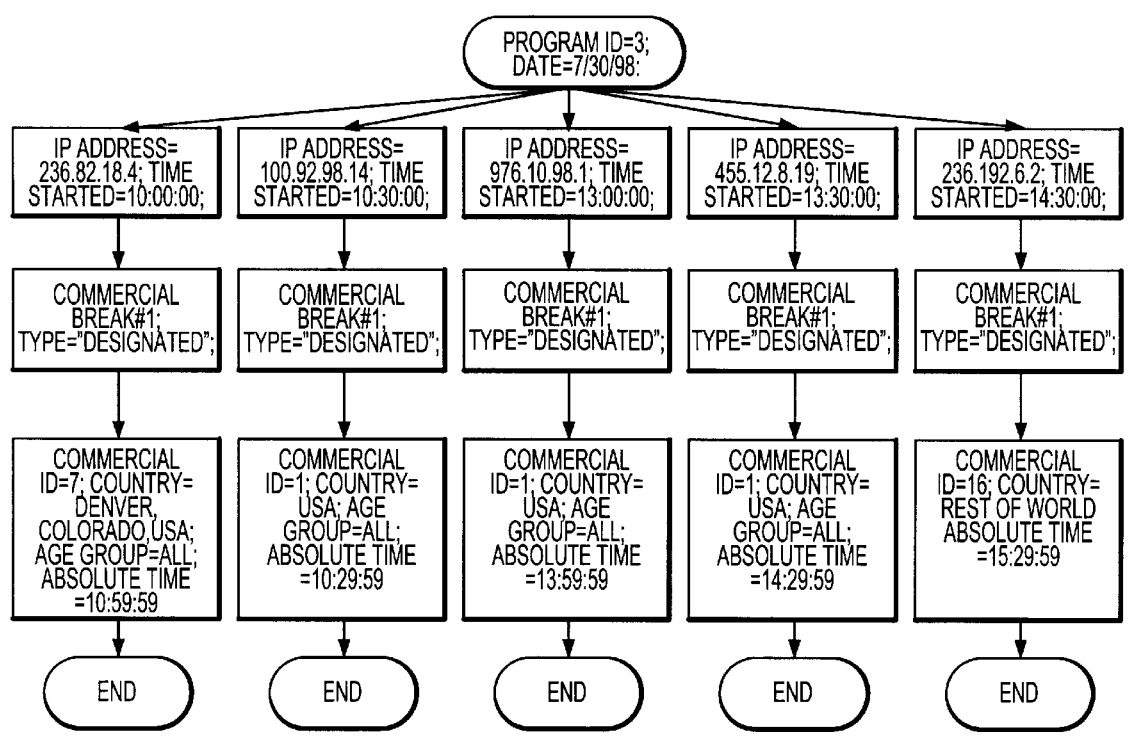
FIG. 23 discloses a flow-chart which describes the broadcasting of commercials during a pre-recorded program stored in the database.

In the decision tree shown in FIG. 23, five different system users are shown accessing the same multimedia file (program ID 3). As can be seen, the system users all begin playing the file at different times and the all the users have different demographics. As part of the download, a commercial break has been scheduled one hour into the playing of the program. When the commercial break is detected, the server, using the demographic information relating to the system users, temporarily stops the download of the program and accesses the database to retrieve a commercial directed at the particular system user. The commercial is downloaded to the system user and when complete, the download of the program is restarted.

For example, it is seen that the user with IP address 976.10.98.1 has started the file at 13:00:00. At 13:59:59 a commercial is scheduled. Once this point is reached, the server accesses the appropriate commercial for a person of that demographic (USA, all ages) and plays the commercial. In this case it is commercial ID 1 which advertises Brand A and plays for 30 seconds. A number of additional commercials may be played throughout the download of the multimedia files and different commercials may be played for the different system users.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of broadcasting over a data network comprising the steps of:
    creating a schedule of programming for broadcast over particular channels at particular times;
    identifying commercial breaks in the schedule of programming;
    identifying commercials to be broadcast and scheduling the commercials during the commercial breaks, wherein each of the commercials includes a particular demographic group to which it should be broadcast;
    broadcasting the commercials during the programming, wherein the step of broadcasting includes the steps of:
        detecting a designated commercial break during the broadcast of the programming;
        retrieving the commercials scheduled to be broadcast during the designated commercial break;
        identifying the demographics for the system users currently receiving the broadcast; and
        individually transmitting the commercials based on the demographics of the system user.

2. The method of claim 1 wherein the data network is the Internet.

3. The method of claim 1 wherein the programming is at least one of: audio information and video information.

4. The method of claim 1 wherein at least one ad hoc commercial is provided which is broadcast to the system users during unscheduled commercial breaks.

5. The method of claim 1 further including the step of broadcasting an interface device with the commercial device which a system user may select to establish a predetermined connection.

6. The method of claim 5 wherein the interface device is an icon and selection of the icon transfers the system user to a chosen website.

7. The method of claim 5 wherein the interface device is an icon and selection of the icon facilitates an IP telephony connection with a chosen party.

8. The method of claim 1 further including the step of scheduling the commercials during the schedule of programming, said scheduling step comprising:
    displaying at least one interface through which the schedule of programming may be accessed;
    accessing the memory to view schedule of programming;
    identify commercial breaks during the programming;
    inserting commercials at designated breaks.

9. The method of claim 1 further including the step of monitoring and counting the system users receiving the broadcast.

10. The method of claim 1 wherein the programming is live and is received from a remote source.

11. The method of claim 1 wherein the step of broadcasting includes the system users accessing and uploading multimedia files stored in the memory.

12. The method of claim 11 wherein one of the multimedia files stored in the memory may be accessed and uploaded simultaneously by a plurality of the system users.

* * * * *